US009971468B2

(12) United States Patent
Ryall et al.

(10) Patent No.: US 9,971,468 B2
(45) Date of Patent: May 15, 2018

(54) AUTOMATICALLY GENERATING COLUMN LAYOUTS IN ELECTRONIC DOCUMENTS

(71) Applicant: ATLASSIAN PTY LTD, Sydney (AU)

(72) Inventors: Matt Ryall, Sydney (AU); Bill Arconati, Sydney (AU); Wesley Atwood Walser, Sydney (AU); Craig Thomas Petchell, Sydney (AU)

(73) Assignee: ATLASSIAN PTY LTD, Sydney (AU)

( * ) Notice: Subject to any disclaimer, the term of this patent is extended or adjusted under 35 U.S.C. 154(b) by 677 days.

(21) Appl. No.: 14/185,349

(22) Filed: Feb. 20, 2014

(65) Prior Publication Data

US 2014/0237350 A1     Aug. 21, 2014

Related U.S. Application Data

(60) Provisional application No. 61/767,654, filed on Feb. 21, 2013.

(51) Int. Cl.
    *G06F 17/24*      (2006.01)
    *G06F 3/0481*      (2013.01)
    (Continued)

(52) U.S. Cl.
    CPC .......... *G06F 3/0481* (2013.01); *G06F 17/212* (2013.01); *G06F 17/2247* (2013.01);
    (Continued)

(58) Field of Classification Search
    CPC ............................. G06F 17/218; G06F 17/243
    See application file for complete search history.

(56) References Cited

U.S. PATENT DOCUMENTS 5,737,442 A * 4/1998 Alam ................. G06K 9/00449
    382/175
6,424,354 B1    7/2002 Matheny
(Continued)

OTHER PUBLICATIONS

Front Page 2003: THe Missing Manual, "O'Reilly Media, Inc.", Aug. 18, 2005, pp. 1-11 https://books.google.com/books?id=VtC7tdu71EwC&dq=frontpage+slip+view+option&source=gbs_navlinks_s.*

(Continued)

*Primary Examiner* — Scott Baderman
*Assistant Examiner* — Mario M Velez-Lopez
(74) *Attorney, Agent, or Firm* — Hickman Palermo Becker Bingham LLP

(57) ABSTRACT

In one aspect, a page layout editor is configured to automatically modify page layouts of Web pages with sections and columns. An online WYSIWYG HTML editor enables users to create page layouts with arbitrary numbers of sections and columns without specialized knowledge of HTML coding techniques. In an embodiment, a computer-implemented data processing method comprises obtaining source code of an electronic document; automatically modifying the source code by adding a coded hierarchy configured to specify definitions of one or more sections and one or more columns, and initially specifying a single section and a single column in the coded hierarchy; receiving first input indicating selection of a particular page layout control among a plurality of page layout controls in a graphical user interface, the input specifying any of: adding a section; deleting a section; changing to a first number of columns; in response to the first input, automatically modifying the source code by changing the coded hierarchy to specify definitions of a different number of sections or the first number of columns as indicated by the input; causing generating an updated editing view of the electronic docu- (Continued)

ment that graphically represents the different number of sections or the first number of columns; wherein the method is performed using one or more computing devices.

18 Claims, 6 Drawing Sheets

(51) Int. Cl.
| | |
|---|---|
| *G06Q 10/10* | (2012.01) |
| *H04L 29/06* | (2006.01) |
| *G06F 17/21* | (2006.01) |
| *G06F 17/22* | (2006.01) |
| *G06F 17/30* | (2006.01) |

(52) U.S. Cl.
CPC ........ *G06F 17/24* (2013.01); *G06F 17/30905* (2013.01); *G06Q 10/10* (2013.01); *G06Q 10/103* (2013.01); *G06Q 10/1097* (2013.01); *H04L 65/403* (2013.01)

(56) References Cited

U.S. PATENT DOCUMENTS

| | | | |
|---|---|---|---|
| 9,117,058 B1 | 8/2015 | Ansari | |
| 2002/0174183 A1 | 11/2002 | Saeidi | |
| 2003/0229859 A1* | 12/2003 | Shiraishi | G06F 3/016 715/273 |
| 2008/0235585 A1* | 9/2008 | Hart | G06F 17/30058 715/717 |
| 2010/0095197 A1 | 4/2010 | Klevenz | |
| 2011/0004845 A1 | 1/2011 | Ciabarra | |
| 2011/0010641 A1 | 1/2011 | Wolff | |
| 2011/0126123 A1* | 5/2011 | Reter | G06Q 10/109 715/751 |
| 2011/0205594 A1* | 8/2011 | Chida | G03G 15/36 358/1.18 |
| 2011/0264705 A1* | 10/2011 | Diamond | G06F 17/218 707/803 |
| 2011/0307883 A1 | 12/2011 | Hilerio | |
| 2012/0032945 A1 | 2/2012 | Dare | |
| 2012/0079004 A1 | 3/2012 | Herman | |
| 2012/0102114 A1 | 4/2012 | Dunn | |
| 2012/0254714 A1* | 10/2012 | Peters | G06F 17/218 715/209 |
| 2012/0296919 A1 | 11/2012 | Sinha | |
| 2013/0024511 A1 | 1/2013 | Dunn | |
| 2013/0091149 A1 | 4/2013 | Dunn | |
| 2013/0218845 A1 | 8/2013 | Kleppner | |
| 2013/0254699 A1 | 9/2013 | Bashir | |
| 2014/0082525 A1 | 3/2014 | Kass | |
| 2014/0173451 A1 | 6/2014 | Klaka | |
| 2014/0237387 A1 | 8/2014 | Ryall | |
| 2014/0237388 A1 | 8/2014 | Ryall | |
| 2014/0237389 A1 | 8/2014 | Ryall | |

OTHER PUBLICATIONS

FrontPage Templates, buytemplates.net as available Feb. 13, 2013, pp. 1-4 https://web.archive.org/web/20130213001419/http://www.buytemplates.net/FrontPage-Templates-web-templates.php.*

U.S. Appl. No. 14/185,386, filed Feb. 20, 2014, Advisory Action, dated Oct. 12, 2016.

U.S. Appl. No. 14/185,379, filed Feb. 20, 2014, First Office Action Interview, dated Oct. 6, 2016.

U.S. Appl. No. 14/185,386, filed Feb. 20, 2014, First Office Action Interview, dated Mar. 21, 2016.

U.S. Appl. No. 14/185,386, filed Feb. 20, 2014, Final Office Action, dated Aug. 4, 2016.

Ryall, U.S. Appl. No. 14/185,386, filed Feb. 20, 2014, Office Action, dated Mar. 1, 2017.

Ryall, U.S. Appl. No. 14/185,374, filed Feb. 20, 2014, Interview Summary, dated Jan. 17, 2017.

Ryall, U.S. Appl. No. 14/185,386, filed Feb. 20, 2014, Final Office Action, dated Jul. 20, 2017.

Ryall, U.S. Appl. No. 14/185,379, filed Feb. 20, 2014, Advisory Action, dated Jun. 15, 2017.

Ryall, U.S. Appl. No. 14/185,379, filed Feb. 20, 2014, Final Office Action, dated Sep. 7, 2017.

Ryall, U.S. Appl. No. 14/185,386, filed Feb. 20, 2014, Adviosry Action, dated Sep. 28, 2017.

U.S. Appl. No. 14/185,379, filed Feb. 20, 2014, Office Action, dated Jul. 13, 2017.

* cited by examiner

AUTOMATICALLY GENERATING COLUMN LAYOUTS IN ELECTRONIC DOCUMENTS

BENEFIT CLAIM

This application claims the benefit under 35 U.S.C. § 119(e) of U.S. Provisional Application No. 61/767,654, filed Feb. 21, 2013, the entire contents of which is hereby incorporated by reference for all purposes as if fully set forth herein.

FIELD OF THE DISCLOSURE

The present disclosure generally relates to computer-implemented techniques for creating and editing electronic documents such as HTML documents or web pages. The disclosure relates more specifically to techniques for creating such documents with columns and other regions such as headers and footers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronic documents that conform to hypertext markup language (HTML) may be created and modified using various forms of HTML editors. Some editors are text-based and facilitate interacting with HTML in source language format, and others are graphical and seek to present page images as they will appear when rendered using a browser. Certain editors may be termed WYSIWYG (what you see is what you get) editors.

Text editors for HTML may provide syntax highlighting to indicate syntax errors in the HTML source code. Templates, toolbars, and keyboard shortcuts may be provided to enable quickly inserting common HTML elements and structures. Wizards, tooltip prompts and auto-completion may help with common tasks. Text HTML editors also may include either built-in functions or integration with external tools for such tasks as source and version control, link-checking, code checking and validation, code cleanup and formatting, spell-checking, uploading by FTP or WebDAV, and structuring as a project. However, text editors require users to understand HTML and any other web technologies the designer wishes to use, such as CSS, JavaScript, and server-side scripting languages.

Some editors allow alternate editing of the source text of objects in more visually organized modes than simple color highlighting, but in modes not considered to provide true WYSIWYG display. Some WYSIWYG editors include the option of using palette windows that enable editing the text-based parameters of selected objects. These palettes allow either editing parameters in fields for each individual parameter, or text windows to edit the full group of source text for the selected object. They may include widgets to present and select options when editing parameters. Adobe GoLive provides an outline editor to expand and collapse HTML objects and properties, edit parameters, and view graphics attached to the expanded objects.

WYSIWYG HTML editors provide an editing interface which resembles how the page is to be displayed in a web browser. These editors may be stand-alone programs, such as Adobe Dreamweaver or Microsoft Frontpage, or come in the form of browser extensions and allow editing directly within the web browser. Because using a WYSIWYG editor may not require any HTML knowledge, they are often easier for an average computer user.

The WYSIWYG view may be achieved by integrating a layout engine, based upon that used in a Web browser, into the editor. The layout engine is considerably enhanced by the editor's developers to allow for typing, pasting, deleting, and manipulation of the content. The goal is that, at all times during editing, the rendered result should represent what is seen later in a typical Web browser. Unfortunately, a given HTML document can have an inconsistent appearance on various platforms and computers for several reasons.

For example, different browsers and applications may render the same HTML source code differently. The same page may display slightly differently in Internet Explorer and Firefox on a high-resolution screen, or considerably differently using the text-only Lynx browser. The HTML also needs to be rendered differently on a PDA, an Internet-enabled television, and on a mobile phone. Usability in a speech or braille browser, or via a screen-reader working with a conventional browser, places demands on entirely different aspects of the underlying HTML. Printing the page, via different browsers and different printers onto various paper sizes around the world introduces other demands. With the correct use of HTML and CSS, there is no need to provide 'Printable page' links and then have to maintain two versions of the whole site. Nor is there any reason to deploy pages that do not fit the user's preferred paper size and orientation, or pages that cause wasting ink printing solid background colors, or that cause wasting paper by reproducing navigation panels that are entirely useless once printed.

An inconsistent appearance also can occur because browsers and computer graphics systems have a range of user settings. For example, users may adjust resolution, font size, color, contrast, and other values, and many modern browsers allow even more user control over page appearance. Consequently, the source HTML essentially represents a suggested appearance for a page that may not be rendered in practice.

Inconsistent appearance also can arise because web browsers have bugs. Web browsers may not conform to current standards and web pages cannot be authored to avoid all of the common browsers' current bugs.

Still another problem is that a single visual style can represent multiple semantic meanings. Semantic meaning, derived from the underlying structure of the HTML document, is important for search engines and also for various accessibility tools. On paper, one can tell from context and experience whether bold text represents a title, emphasis, or something else, but conveying this distinction in a WYSIWYG editor is difficult. Making a piece of text bold in a WYSIWYG editor is not sufficient to tell the editor what the boldness means.

As a result, typical WYSIWYG editors produce page layouts or appearances that are not guaranteed to provide a consistent view to all users. The foregoing problems are more pronounced when users edit live web pages that are populated with data and content and viewed at a browser during an active session, as opposed to static web pages which are empty forms that created and/or edited outside of an active session. Examples of online WYSIWYG HTML editors include CKEditor, OpenBEXI, SnapEditor, TinyMCE, WYMeditor, and YUI Rich Text Editor. However, online WYSIWYG HTML editors usually have a limited ability to generate graphic elements relating to page layouts of web pages such as sections and columns.

Consequently, there is a need for an online WYSIWYG HTML editor that makes it intuitive for users to create basic page layouts and to create and modify basic page layouts, and that eliminates the need for special treatment of sections and columns for basic page layouts.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. Overview

In one aspect, a page layout editor is configured to automatically modify page layouts of Web pages with sections and columns. An online WYSIWYG HTML editor enables users to create page layouts with arbitrary numbers of sections and columns without specialized knowledge of HTML coding techniques. In an embodiment, a computer-implemented data processing method comprises obtaining source code of an electronic document; automatically modifying the source code by adding a coded hierarchy configured to specify definitions of one or more sections and one or more columns, and initially specifying a single section and a single column in the coded hierarchy; receiving first input indicating selection of a particular page layout control among a plurality of page layout controls in a graphical user interface, the input specifying any of: adding a section; deleting a section; changing to a first number of columns; in response to the first input, automatically modifying the source code by changing the coded hierarchy to specify definitions of a different number of sections or the first number of columns as indicated by the input; causing generating an updated editing view of the electronic document that graphically represents the different number of sections or the first number of columns; wherein the method is performed using one or more computing devices Embodiments of the invention provide a page layout editor for graphic elements of Web pages, such as sections and columns. Embodiments of the invention thus comprise an online WYSIWYG HTML editor that makes it intuitive for users to create basic page layouts, that makes it easy to create and modify basic page layouts.

2. Example Embodiments

2.1 Structural and Functional Overview

Figure 1:
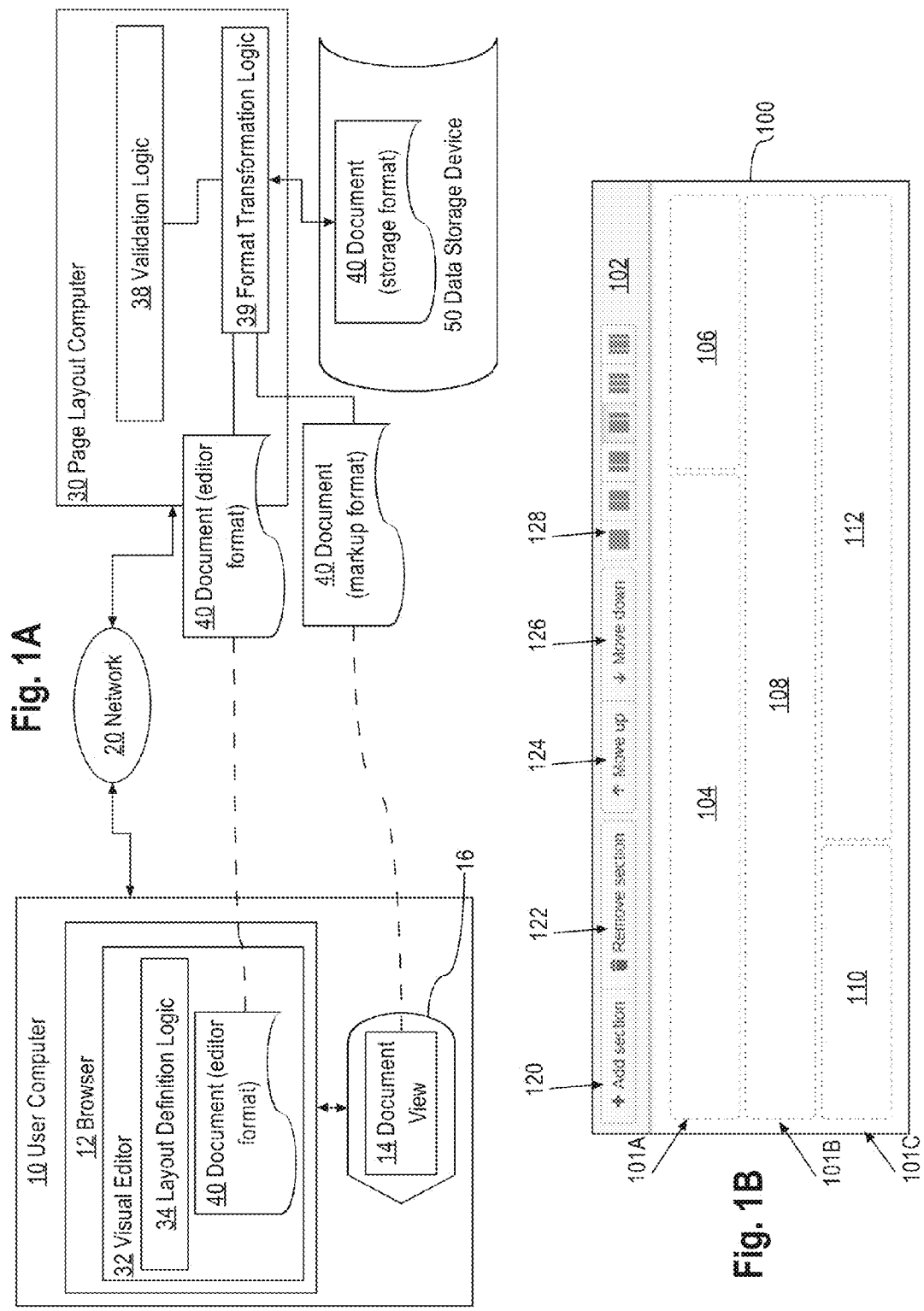
FIG. 1A illustrates an example networked computer system with which an embodiment may be implemented.
FIG. 1B illustrates an example user interface for a visual editor.
Figure 2:
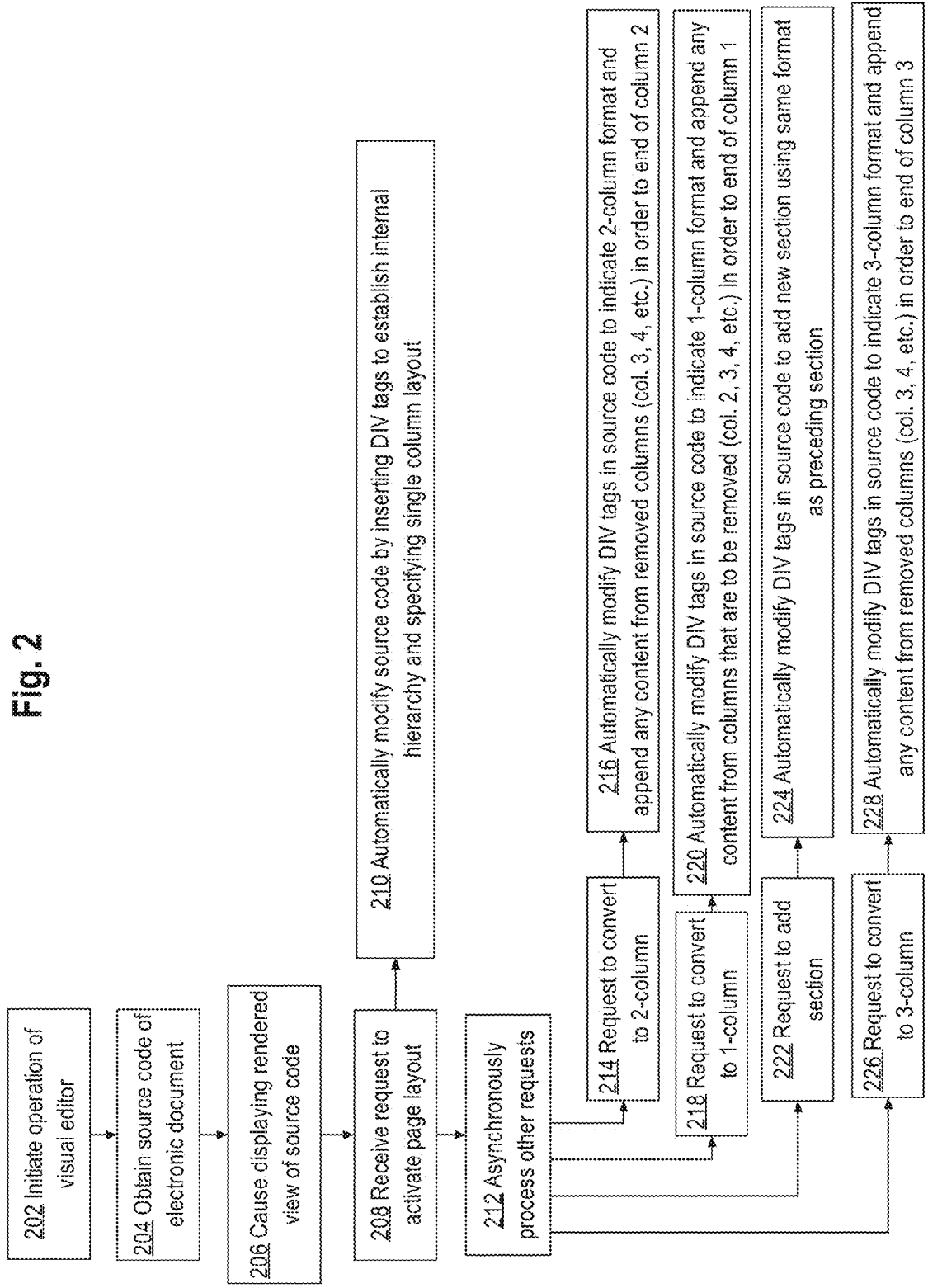
FIG. 2 illustrates a data processing method for automatically generating column layouts in electronic documents.

FIG. 1A illustrates an example networked computer system with which an embodiment may be implemented; FIG. 1B illustrates an example user interface for a visual editor; FIG. 2 illustrates a data processing method for automatically generating column layouts in electronic documents. For convenience and to illustrate a clear example, FIG. 1A, FIG. 1B, and FIG. 2 are described concurrently, but other embodiments may implement the approach of FIG. 2 in contexts other than those of FIG. 1A, FIG. 1B.

Referring first to FIG. 1A, in an embodiment, a user computer 10 is coupled directly or indirectly through one or more networks 20 to a page layout computer 30 that is coupled to or can access a data storage device 50. User computer 10 may comprise any computing device such as a personal computer, workstation, tablet computer or smartphone. User computer 10 hosts or executes a browser 12, which may comprise a commercially available web browser program such as FIREFOX, SAFARI, CHROME, etc.

In an embodiment, browser 12 hosts a visual editor 32 comprising layout definition logic 34 that are configured for use in editing document 40 in editor format and requesting a rendering of the document to result in obtaining the document in markup format for generating a document view 14. In an embodiment, the visual editor 32 comprises JAVASCRIPT code that the page layout computer 30 serves to the browser 12. Browser 12 is capable of generating the document view 14 on a display device 16 of the user computer 10; in this context, the document view represents the fully rendered visual appearance of an electronic document. An example of an electronic document is an HTML document or web page. Layout definition logic 34 is configured to support modifying or manipulation of page layouts of the document 40, in editor format, within the browser 12; after an editing session is complete, the visual editor 32 returns the document to the format transformation logic 39 for conversion back into storage format for use on data storage device 50.

Network 20 broadly represents one or more local or wide area networks and/or internetworks, using any of wired, wireless, terrestrial, microwave or satellite links.

Page layout computer 30 may comprise any computing device having resources sufficient to execute the functions that are described herein and may comprise, in various embodiments, a server computer, workstation, one or more virtual machine instances in a data center or cloud computing infrastructure, or a combination. In an embodiment, the page layout computer 30 hosts validation logic 38 and format transformation logic 39. The validation logic 38 is configured to perform validation of the document 40 during or as a result of transformation between editor and storage formats for loading and saving within the visual editor 32, and from storage format to view format in connection with rendering the document for viewing as document view 14.

Format transformation logic 39 is configured to perform transformation of the document 40 between a storage format, editor format, and view format in connection with loading, saving, and rendering operations. As seen in FIG. 1A, in an embodiment the document 40 is in storage format when stored in data storage device 50; the format transformation logic 39 transforms the storage format to editor format when the visual editor 32 requests the document for editing, and transforms the storage format to markup format when the visual editor or browser 12 requests the document for viewing on display device 16. Typically the markup format is HTML, based upon XHTML with extensions to support page layouts and other features; this approach enables the system to store the document 40 in a relatively compact and efficient format while dynamically appending extensions to the document to support page layout features in an environment in which the form and content of the extensions can change over time.

In this embodiment, browser 12 connects to page layout computer 30 and interacts with visual editor 32 as a service. However, in other embodiments, the techniques described herein can be implemented in a visual editor that is installed as local software on user computer 10 to which browser 12 connects locally without needing a network connection to the page layout computer 30.

Layout definition logic 34 comprises, in various embodiments, one or more computer programs, other software element, or other digital logic or functional units that are configured to perform the page layout and modification functions that are further described herein. Document source code 36 comprises, in one embodiment, HTML source code for a web page that is typically associated with a web site. Document source code 36 represents, in FIG. 1A, a representation of the web page that is managed in memory of the page layout computer 30 and corresponds to document view 14; in some embodiments, the document source code may be saved in a different format as document 40 on data storage device 50. Thus, in this example the same logical web page may have be represented using document view 14, document source code 36, and stored document 40. Examples of corresponding code representations for document view 14, document source code 36, and stored document 40 are described in several examples in other sections herein.

Layout definition logic 34 is configured to cooperate with visual editor 32 to generate user interface displays that are configured to represent web pages, receive user input representing manipulations of controls for sections, columns, headers and footers, and to manage document source code 36 and update the displays in response to the user input.

Referring now to FIG. 1B, in one embodiment, using the layout definition logic 34 a user interface display 100 may be generated to represent a web page having one or more sections, columns and other layout features. Sections are horizontal areas and columns are vertical areas. To add structure to the information on a page, it is often useful to split the information into columns. It is often desirable to have more than one column across the width of the page. A user may also want to use a common structure on a number of pages, so that readers know where to find the information within each page. In addition to columns, sections are useful to organize content and a section may contain one or more columns.

Embodiments provide a set of predefined page layouts. Each layout provides one or more columns. Some layouts also provide a horizontal block at the top and bottom of the page. The layout that is selected determines the position of the sections and columns on the page, as well as the relative width of the columns. The page's content may be confined within the borders of the layout. In one embodiment, the user can add new sections to the document and can move the existing sections, including headers or footers, above or below other existing sections.

In the example of FIG. 1B, display 100 comprises a first section 101A having a first column 104 and a second column 106; a second section 101B having a single column 108; and a third section 101C having a first column 110 and second column 112. However, in other embodiments, any number of sections may be formed, and each section may have from one to any number columns. In practice, one to three columns is typical to provide a good appearance for text and graphics, but embodiments do not require any limit on the number of columns in a section.

Columns may have different widths or equal widths. In an embodiment, the page layout logic 34 is configured to automatically determine columns of equal widths and to adapt the width of the columns to fit the width of the page. If a column includes a large table, the page layout logic 34 is configured to automatically add code to cause displaying a horizontal scroll bar when viewing the page.

Section and column macros, and tables, may be specified within the sole column of a 1-column section, or within any of the columns in sections that have multiple columns.

In an embodiment, during editing, boundaries of sections and columns are indicated by broken lines, but the broken lines are not visible when the page is rendered at browser 12 after editing and during normal retrieval and display.

Data storage device 50 represents one or more elements of data storage that may be co-located with page layout computer 30, or in a storage area network, or in remote networked data storage, in various embodiments. Both page layout computer 30 and data storage device 50 may comprise instances of processing and data storage resources that are in a remote data center or cloud-based computing infrastructure.

Figure 4:
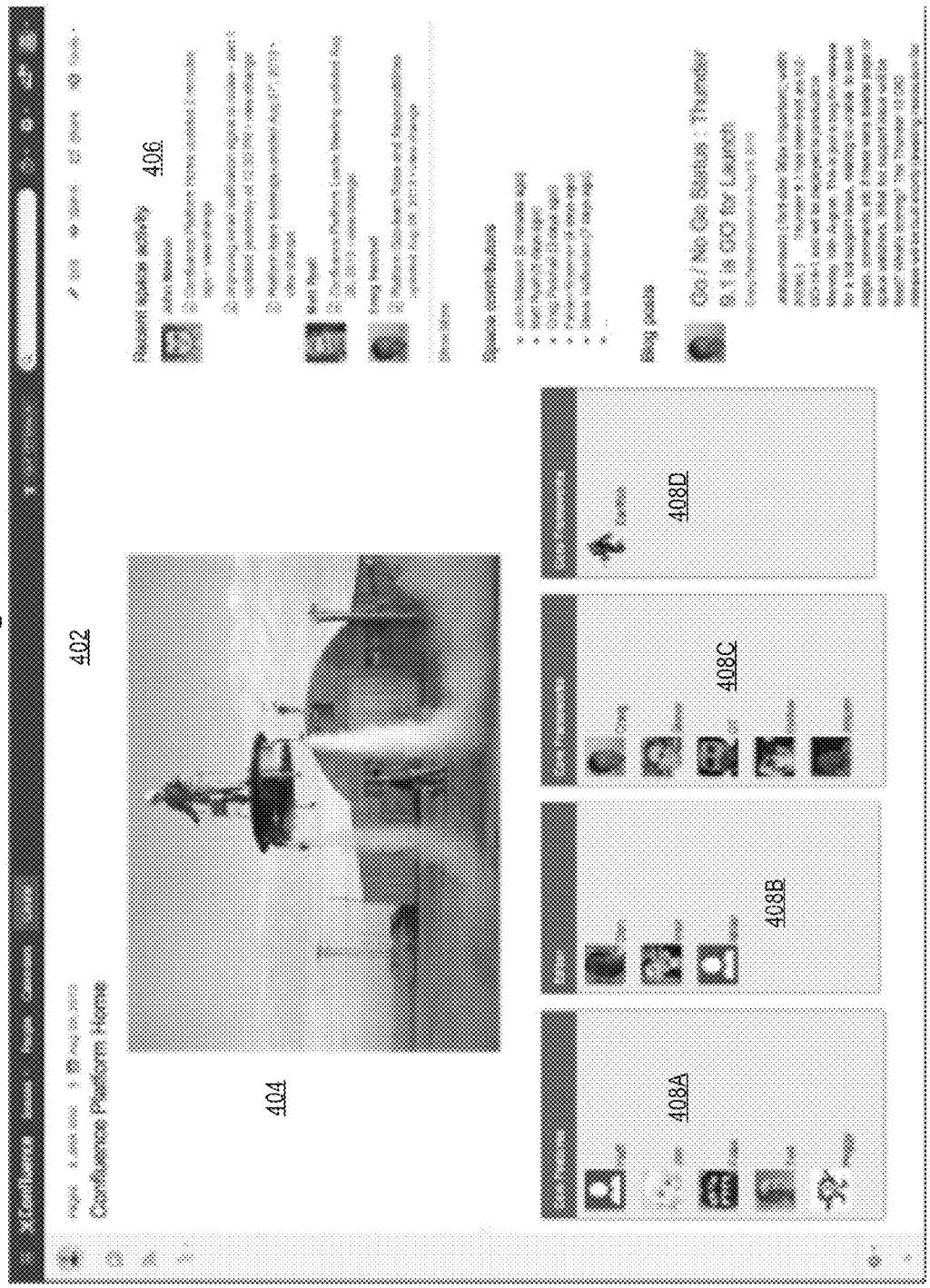
FIG. 4 illustrates an example two column page layout with a four column nested layout within one of the two columns prepared using the techniques herein in combination with section column macros and/or a page include macro.

In an embodiment, user interface display 100 may comprise a tool bar 102 having an add section control 120, a remove section control 122, a move up control 124, a move down control 126, and one or more column controls 128. A current editing position of the user within the document may be indicated graphically by a caret in or near one of the columns. In an embodiment, user input selecting the add section control 120 causes the layout definition logic 34 to automatically modify the document source code 36 by changing tags and element values in the source code so that the document view 14 will include an additional section that is added below the current section, where the current section is the parent section of the column at which the caret is shown or located. In an embodiment, document 40 with the modifications at the end of an editing session or in response to selecting a SAVE control or a draft save control; unsaved changes are not visible to other users. The column controls graphically indicate available page layouts and include, in this example, controls for layouts with between one and three columns. In other embodiments, column controls 128 may be used in combination with column macros and/or page include macros to provide more complex layouts, for example, as seen in FIG. 4. Additionally or alternatively, in some embodiments the column controls 128 may be configured to permit selection of any number of columns using an appropriate GUI widget for selecting the number.

In an embodiment, user input selecting the remove section control 122 causes the layout definition logic 34 to automatically modify the document source code 36 by changing tags and element values in the source code so that the document view 14 does not include a particular section; specific coding techniques are described in other sections herein.

In an embodiment, user input selecting the move up control 124 or move down control 126 causes the layout definition logic 34 to automatically modify the document source code 36 by changing tags and element values in the source code so that the document view 14 will include a particular section in a different position, and to store document 40 with the modifications; specific coding techniques are described in other sections herein.

In an embodiment, user input selecting one of the column controls 128 causes the layout definition logic 34 to automatically modify the document source code 36 by changing tags and element values in the source code so that the document view 14 will include one or more additional columns and/or one or more fewer columns, to move content from a previous column to a newly created column, and to store document 40 with the modifications; specific coding techniques are described in other sections herein.

In an embodiment, icons representing different column controls 128 indicate relative widths of columns in different page layouts that are associated with the controls. In the example of FIG. 1B, six (6) column controls 128 are associated respectively with the following page layouts: single column; two-column with equal-width columns; two-column with non-equal width columns where the right-hand column is wider; two-column with non-equal width columns where the left-hand column is wider; three-column layout; three-column layout with two narrow columns at the sides and a wider central column. In other embodiments, any number of column controls 128 may be provided and the associated page layouts of the column controls may vary.

Referring now to FIG. 2, in one embodiment of a data processing process for automatically generating column layouts in electronic documents, at block 202, the process initiates operation of a visual editor. For example, visual editor 32 is invoked, typically in response to the user computer 10 connecting to page layout computer 30, providing appropriate login credentials, and selecting the invocation via browser 12.

At block 204, the process obtains the source code of an electronic document. For example, browser 12 at user computer 10 provides input specifying a particular website, HTML file, or other source of document source code 36 such as document 40. Block 204 may comprise the user computer 10 interacting with a file browse or file open dialog to locate a particular file or document at data storage device 50. The particular mechanism used to obtain document 40 for editing is not critical; the result is transient storage in memory of document source 36 as a basis for editing.

At block 206, the process causes displaying a rendered view of the source code. For example, visual editor 32 provides the document source code 36 to browser 12, which uses a rendering engine integrated into the browser to render a web page or other visual representation of the document source code in the form of document view 14.

As previously noted, in an embodiment, markup changes for different page layouts may be represented in three types. An Editor type may represent how the markup looks while editing, and corresponds to document source code 36. A View type may represent how the markup appears in a normal rendered page, for example, in document view 14. A Storage type may represent how the markup appears in storage, and corresponds to document 40. For purposes of illustrating a clear example, assume that a particular set of markup has the layout shown in TABLE 1:

TABLE 1

NORMAL PAGE LAYOUT

| Editor | <p>Normal</p> |
|---|---|
| View | <p>Normal</p> |
| Storage | <p>Normal</p> |

At block 208, the process receives a request to activate a page layout capability for the particular page. For example, user input via browser 12 may specify a page layout control in a graphical user interface that the visual editor 32 provides to the browser. Alternatively, activating page layout capability may involve selecting a file by name from a list or using a file browse or file open dialog and selecting a layout activation control in association with the file name. In some embodiments, to choose a page layout, while editing the page, input from user computer 10 indicates selecting the page layout icon. A dropdown list appears, showing icons that illustrate the available layouts and user input is provided to select a layout.

In an embodiment, at block 210, in response to the request to activate the page layout capability, the process automatically modifies the source code that was obtained at block 204 by inserting division (DIV) tags to establish an internal hierarchy to facilitate future layout changes, and to specify a single column layout. For example, the layout of TABLE 1 may be transformed as indicated in TABLE 2:

TABLE 2

PAGE LAYOUT ACTIVATED

| Editor | <div class="contentLayout2"> |
|---|---|
|  |   <div class="columnLayout single" data-layout="single"> |
|  |     <div class="cell normal" data-type="normal"> |
|  |       <div class="innerCell" contenteditable="true"> |
|  |         <p>Layout R1C1</p> |
|  |       </div> |
|  |     </div> |
|  |   </div> |
|  | </div> |
| View | <p>Layout R1C1</p> |
| Storage | <p>Layout R1C1</p> |

The resulting layout in the editor type comprises a nested hierarchy comprising a plurality of DIV tag pairs, each pair comprising an HTML opening <div> tag and a closing </div> tag. Attributes of the DIV tags specify a single column layout and the content type of cells within the single column. Existing content for the page is moved into the newly defined single column. By establishing a hierarchy of DIV tag pairs that specify a layout, a column within the layout, cell values within the column, and content attributes of an inner cell within the first cell, a flexible document markup structure is formed that can be automatically manipulated by other operations to rapidly form, remove or rearrange sections or columns.

Further, as seen in TABLE 2, for purposes of compact saving and storage operations, the code may be collapsed automatically to a normal page format in response to a SAVE request or the equivalent.

At block 212, the process asynchronously processes other requests. "Asynchronous," in this context, refers to the ability to process any of the operations shown in block 214 to block 228 in response to a request of a user; in other words, block 214, 218, 222, 226 represent options and not a required serial set of steps. In an embodiment, changing a page layout of a document precludes performing any other editing operations within the same editor until the page layout change is complete. In an embodiment, the visual editor 32 may receive any of a plurality of different page formatting requests at any time during an editing session. Requests may correspond to the page layout controls that have been described for FIG. 1B. Block 214 to block 228, inclusive, represent examples of requests that may be received and transformations of electronic document code in response to those requests. The order of presentation of block 214 to block 228 is not critical and the operations described herein may be performed asynchronously in any order.

As a first example, at block 214, the process receives a request to convert an electronic document to 2-column format. For example, user input specifies selecting one of the column controls 128 represented using an icon having two columns. In response, at block 216, the process automatically modifies the source code that was obtained at block 204 by inserting DIV tags in the source code to indicate the 2-column format and to append any content from columns that are to be removed (columns 3, 4, etc.) in order to the end of the second column. Note that the storage format allows the layout definition logic 34 to easily change how the layouts are represented in the view type and the editing type of layout.

TABLE 3

CONVERT TO 2-COLUMN; ADD CONTENT TO $2^{ND}$ COLUMN

| | |
|---|---|
| Editor | <div class="contentLayout2"> |
| |   <div class="columnLayout two-equal" data-layout="two-equal"> |
| |     <div class="cell normal" data-type="normal"> |
| |       <div class="innerCell" contenteditable="true"> |
| |         <p>Layout R1C1</p> |
| |       </div> |
| |     </div> |
| |     <div class="cell normal" data-type="normal"> |
| |       <div class="innerCell" contenteditable="true"> |
| |         <p>R1C2</p> |
| |       </div> |
| |     </div> |
| |   </div> |
| | </div> |
| View | <div class="contentLayout2"> |
| |   <div class="columnLayout two-equal" data-layout="two-equal" > |
| |     <div class="cell normal" data-type="normal"> |
| |       <div class="innerCell"> |
| |         <p>Layout R1C1</p> |
| |       </div> |
| |     </div> |
| |     <div class="cell normal" data-type="normal"> |
| |       <div class="innerCell"> |
| |         <p>R1C2</p> |
| |       </div> |
| |     </div> |
| |   </div> |
| | </div> |
| Storage | <ac: layout> |
| |   <ac:layout-section ac:type="two_equal"> |
| |     <ac:layout-cell> |
| |       <p>Layout R1C1</p> |
| |     </ac:layout-cell> |
| |     <ac:layout-cell> |
| |       <p>R1C2</p> |
| |     </ac:layout-cell> |
| |   </ac:layout-section> |
| | </ac:layout> |

When the number of columns changes, any text, images or macros in a section are not lost. When the number of columns decreases, the page layout logic 34 is configured to operate as follows. If a column is removed as the result of the number of columns decreasing, then the content of that column is appended to the end of the last column in the next section layout. If multiple columns are removed, the content is appended to the last column in order from left to right. When the number of columns increases, the page layout logic 34 adds blank columns to the right of existing content.

As another example, at block 218, the process receives a request to convert an electronic document back to 1-column format. For example, user input specifies selecting one of the column controls 128 (FIG. 1B) that is represented by an icon having a single column. In response, at block 220, the process automatically modifies the then-current source code by inserting DIV tags in the source code to indicate the 1-column format and to append any content from columns that are to be removed (columns 2, 3, 4, etc.) in order to the end of column 1.

TABLE 4

CHANGE BACK TO A SINGLE COLUMN

| | |
|---|---|
| Editor | <div class="contentLayout2"> |
| |   <div class="columnLayout single" data-layout="single"> |
| |     <div class="cell normal" data-type="normal"> |
| |       <div class="innerCell" contenteditable="true"> |
| |         <p>Layout R1C1</p> |
| |         <p>R1C2</p> |
| |       </div> |
| |     </div> |
| |   </div> |
| | </div> |
| View | <p>Layout R1C1</p> |
| | <p>R1C2</p> |
| Storage | <p>Layout R1C1</p> |
| | <p>R1C2</p> |

As another example, at block 222, the process receives a request to add a section to the electronic document. For example, user input specifies selecting the add section control 120 of FIG. 1B. In response, at block 224, the process automatically modifies the then-current source code by inserting DIV tags in the source code to indicate the new section as seen in TABLE 5.

TABLE 5

ADD A SECTION TO THE MARKUP OF TABLE 3

| | |
|---|---|
| Editor | <div class="contentLayout2"> |
| |   <div class="columnLayout two-equal" data-layout="two-equal"> |
| |     <div class="cell normal" data-type="normal"> |
| |       <div class="innerCell" contenteditable="true"> |
| |         <p>Layout R1C1</p> |
| |       </div> |
| |     </div> |
| |     <div class="cell normal" data-type="normal"> |
| |       <div class="innerCell" contenteditable="true"> |
| |         <p>R1C2</p> |
| |       </div> |
| |     </div> |
| |   </div> |
| | </div class="columnLayout two-equal" data-layout="two-equal"> |
| |     <div class="cell normal" data-type="normal"> |
| |       <div class="innerCell" contenteditable="true"> |
| |         <p>R2C1</p> |
| |       </div> |
| |     </div> |
| |     <div class="cell normal" data-type="normal"> |
| |       <div class="innerCell" contenteditable="true"> |
| |         <p>R2C2</p> |
| |       </div> |
| |     </div> |
| |   </div> |
| | </div> |

TABLE 5-continued

ADD A SECTION TO THE MARKUP OF TABLE 3

| | |
|---|---|
| View | `<div class="contentLayout2">`<br>  `<div class="columnLayout two-equal" data-layout="two-equal">`<br>    `<div class="cell normal" data-type="normal">`<br>      `<div class="innerCell">`<br>        `<p>Layout R1C1</p>`<br>      `</div>`<br>    `</div>`<br>    `</div class="cell normal" data-type="normal">`<br>      `</div class="innerCell">`<br>        `<p>R1C2</p>`<br>      `</div>`<br>    `</div>`<br>  `</div>`<br>  `</div class="columnLayout two-equal" data-layout="two-equal">`<br>    `<div class="cell normal" data-type="normal">`<br>      `<div class="innerCell">`<br>        `<p>R2C1</p>`<br>      `</div>`<br>    `</div>`<br>    `<div class="cell normal" data-type="normal">`<br>      `<div class="innerCell">`<br>        `<p>R2C2</p>`<br>      `</div>`<br>    `</div>`<br>  `</div>`<br>`</div>` |
| Storage | `<ac:layout>`<br>  `<ac:layout-section ac:type="two_equal">`<br>    `<ac:layout-cell>`<br>      `<p>Layout R1C1</p>`<br>    `</ac:layout-cell>`<br>    `<ac:layout-cell>`<br>      `<p>R1C2</p>`<br>    `</ac:layout-cell>`<br>  `</ac:layout-section>`<br>  `<ac:layout-section ac:type="two_equal">`<br>    `<ac:layout-cell>`<br>      `<p>R2C1</p>`<br>    `</ac:layout-cell>`<br>    `<ac:layout-cell>`<br>      `<p>R2C2</p>`<br>    `</ac:layout-cell>`<br>  `</ac:layout-section>`<br>`</ac:layout>` |

TABLE 6

3-COLUMN LAYOUT

| | |
|---|---|
| Editor | `<div class="contentLayout2">`<br>  `<div class="columnLayout three-with-sidebars" data-layout="three-withsidebars">`<br>    `<div class="cell sidebars" data-type="sidebars">`<br>      `<div class="innerCell" contenteditable="table">`<br>        `<p>Narrow R1C1</p>`<br>      `</div>`<br>    `</div>`<br>    `<div class="cell normal" data-type="normal">`<br>      `<div class="innerCellI"contenteditable="true">`<br>        `<p>Wide R1C3</p>`<br>      `</div>`<br>    `</div>`<br>    `<div class="cell sidebars" data-type="sidebars">`<br>      `<div class="innerCell" contenteditable="true">`<br>        `<p>Narrow R1C2</p>`<br>      `</div>`<br>    `</div>`<br>  `</div>`<br>`</div>` |
| View | `<div class="contentLayout2">`<br>  `<div class="columnLayout three-with-sidebars" data-layout="three-with-sidebars">`<br>    `<div class="cell sidebars" data-type="sidebars">`<br>      `<div class="innerCell">`<br>        `<p>Narrow R1C1</p>`<br>      `</div>`<br>    `</div>`<br>    `<div class="cell normal" data-type="normal">`<br>      `<div class="innerCell">`<br>        `<p>Wide R1C2</p>`<br>      `</div>`<br>    `</div>`<br>    `<div class="cell sidebars" data-type="sidebars">`<br>      `<div class="innerCell">`<br>        `<p>Narrow R1C3</p>`<br>      `</div>`<br>    `</div>`<br>  `</div>`<br>`</div>` |
| Storage | `<ac:layout>`<br>  `<ac:layout-section ac:type="three_with_sidebars">`<br>    `<ac:layout-cell>`<br>      `<p>Narrow R1C1</p>`<br>    `</ac:layout-cell>`<br>    `<ac:layout-cell>`<br>      `<p>Wide R1C2</p>`<br>    `</ac:layout-cell>`<br>    `<ac:layout-cell>`<br>      `<p>Narrow R1C3</p>`<br>    `</ac:layout-cell>`<br>  `</ac:layout-section>`<br>`</ac:layout>` |

In an embodiment, the tags may specify that the new section uses the same format as a prior section.

As another example, at block 226, the process receives a request to convert an electronic document to 3-column format. For example, user input specifies one of the column controls 128 that is represented by an icon having three columns.

Figure 3:
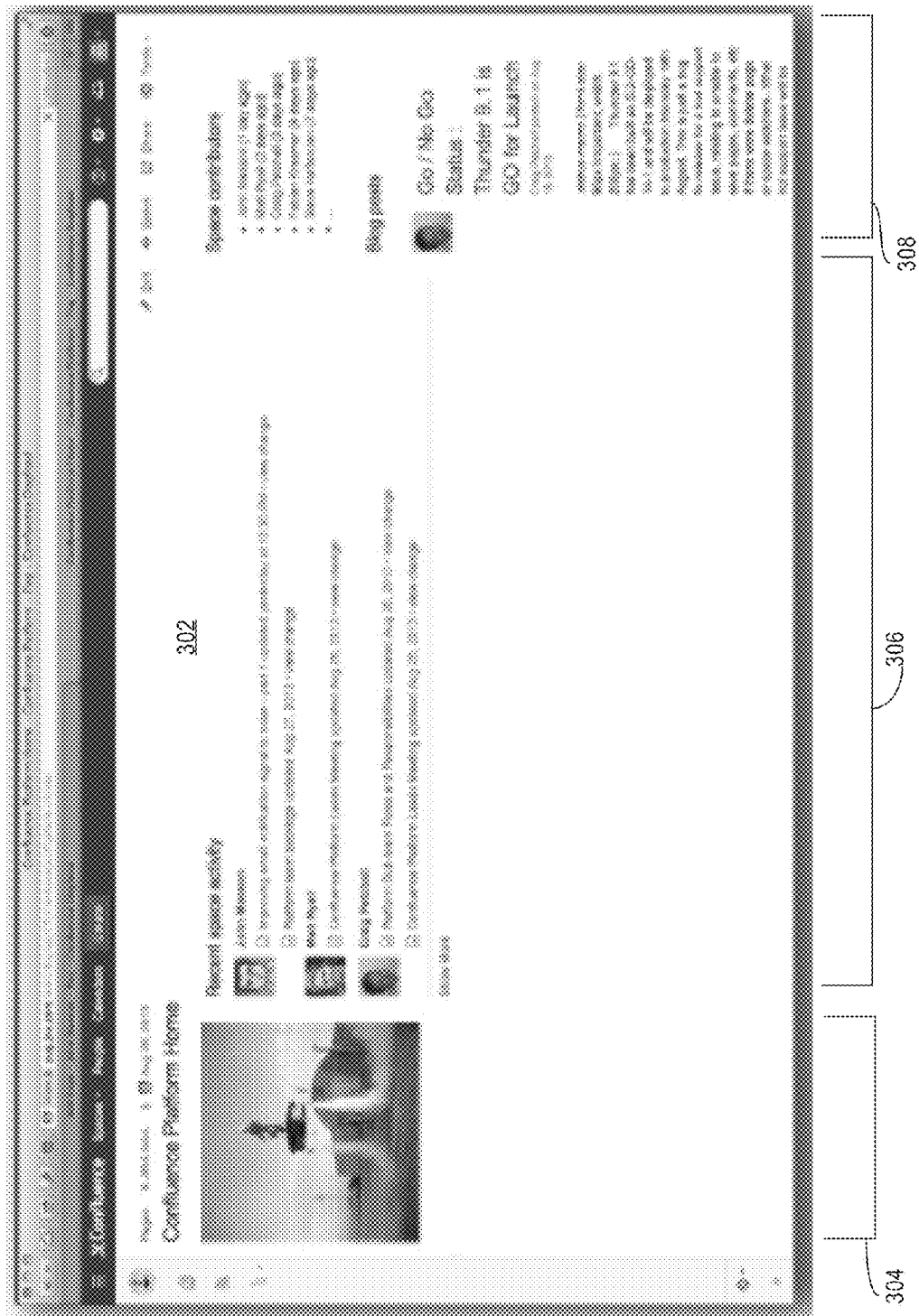
FIG. 3 illustrates an example three column page layout having columns of different width.

FIG. 3 illustrates an example three column page layout having columns of different width. In an embodiment, a web page 302 may comprise a first column 304, second column 306, and third column 308. Widths of first column 304 and third column 308 may be equal and the second column 306 may be larger or smaller than the other widths.

In response to block 226, at block 228, the process automatically modifies the then-current source code by inserting DIV tags in the source code to indicate the 3-column format and to append any content from columns that are to be removed (columns 4, 5, etc.) in order to the end of column 3.

FIG. 4 illustrates an example two column page layout with a four column nested layout within one of the two columns prepared using the techniques herein in combination with section column macros and/or a page include macro. In this example, a web page 402 comprises a first column 404 and a second column 406 having unequal widths. The first column 404 comprises four columns 408A, 408B, 408C, 408D that are nested in the first column.

Figure 5:
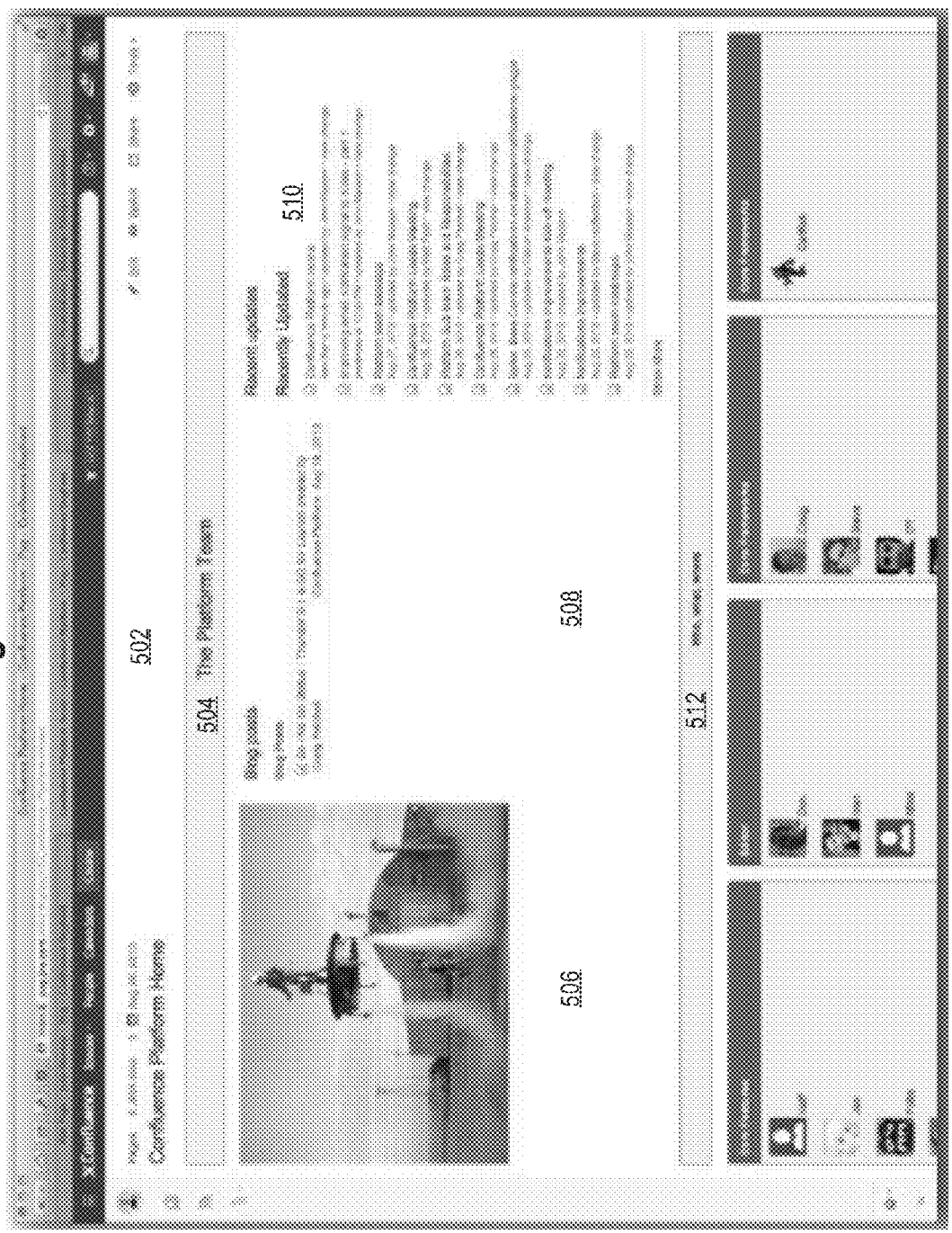
FIG. 5 illustrates an example page with a three-column layout and having a header and footer.
Figure 6:
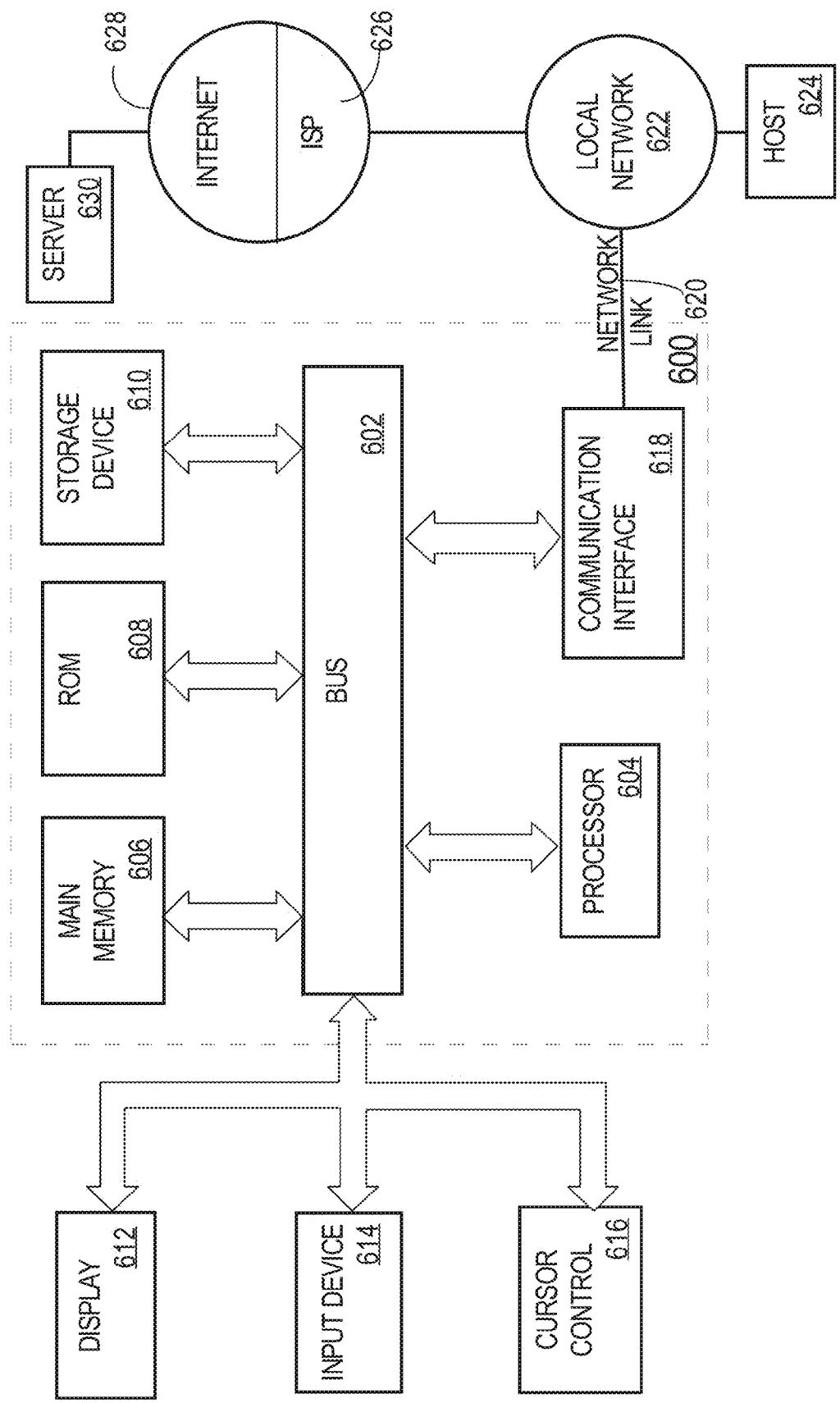
FIG. 6 illustrates a computer system with which an embodiment may be implemented.

FIG. 5 illustrates an example page with a three-column layout and having a header and footer. In this example, a web page 502 comprises a header 504, three equal-width columns 506, 508, 510, and a footer 512. Using the techniques herein, columns 506, 508, 510 may be established in a section of the web page 502 without disturbing the header 504 and footer 512.

2.2 Example Benefits of Certain Embodiments

Thus, embodiments provide a page layout editor for graphic elements of Web pages, such as sections and columns. Embodiments thus comprise an online WYSIWYG HTML editor that makes it intuitive for users to create basic page layouts, that makes it easy to create and modify basic page layouts, and that eliminates the need for special treatment of sections and columns for basic page layouts. In particular, detailed knowledge about the use of DIV tags or other coding techniques for the document source code 36 are not required to obtain a document view 14 having sections and columns in a particular desired order and layout.

In one embodiment, visual editor 32 may be integrated into other computer-based systems that provide functions for managing and sharing content using browsers and online storage. For example, visual editor 32 may be implemented as a component of a wiki-like system, such as CONFLUENCE, commercially available from Atlassian, Inc., Sydney, Australia.

Wiki systems may comprise collaborative software that manages a website that is configured for users to create and collaboratively edit web pages via a web browser. The content, including all current and previous revisions, is usually stored in either a file system or a database. Typically the website is continuously online and users may view, edit, or otherwise manage content at any time, often as part of global teams involved in a relatively continuous work cycle. In an embodiment, visual editor 32 may interoperate with document source code 36 for a live web page that is capable of downloading to browser 12 for rendering at user computer 10 at any time, including during or immediately after editing. In an embodiment, layout definition logic 34 is configured to enable a user to pick a layout for a wiki page from among a plurality of available layouts represented, for example, using the column controls 128. For example, in one embodiment the user can split live content into two columns, resulting in two separate editable areas, where there had previously been one such area. In an embodiment, layout definition logic 34 is configured to allow a user to move content such as text, tables, images, and links among columns within a section, while concurrently respecting editing restrictions with regard to other portions of the page. Embodiments provide this functionality with no requirement for the user to know the HTML or other coding underlying the electronic document.

Embodiments may be useful in creating online page layouts, for example, for team landing pages in a wiki; project home pages; default space homepages; and others.

3. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method comprising:
    obtaining, by a page layout computer, source code of an electronic document comprising content;
    in response to a request to activate a page layout of the electronic document and before receiving first input indicating a modification of the electronic document, automatically modifying, by the page layout computer, the source code by adding a coded hierarchy configured to specify definitions of one or more sections and one or more columns, and initially specifying a single section and a single column in the coded hierarchy to include the content that is specified by the source code when the electronic document is obtained;
    receiving, by the page layout computer, the first input indicating the selection of a particular page layout control among a plurality of page layout controls in a graphical user interface, the input specifying any of: adding a section; deleting a section; changing to a first number of columns;
    in response to the first input and by the page layout computer, modifying the source code by changing the coded hierarchy to specify definitions of a different number of sections or the first number of columns as indicated by the input including at least, in part, the content specified by the source code when the electronic document is obtained in the different number of sections or the first number of columns;
    causing, by the page layout computer, generating an updated editing view of the electronic document that graphically represents the different number of sections or the first number of columns;
    wherein the method is performed using one or more computing devices.

2. The method of claim 1 wherein the source code comprises HTML and wherein the coded hierarchy comprises two or more nested sets of division (DIV) tags.

3. The method of claim 2 wherein the sets comprise a first set of DIV tags that indicates a section and a second set of DIV tags, nested within the first set, which indicates one or more columns within the section.

4. The method of claim 1 comprising:
    receiving second input indicating selection of a second, different particular page layout control that is associated with changing to two or more columns;
    in response to the second input, automatically modifying the source code by changing the coded hierarchy to indicate the two or more columns based upon the second input, and by moving content from a section or single column of the electronic document to a particular column among the two or more columns;
    causing generating a second updated editing view of the electronic document that graphically represents the two or more columns and the content in the particular column.

5. The method of claim 1 wherein the source code comprises HTML and wherein the coded hierarchy comprises two or more nested sets of division (DIV) tags, wherein the sets comprise a first set of DIV tags that indicates a layout, a second set of DIV tags, nested within the first set, which indicates one or more columns within the layout, and other sets of DIV tags, nested within the first set and second set, that indicate cell values within the column and content attributes of an inner cell within a first cell.

6. The method of claim 1 wherein each of the page layout controls is associated with a plurality of different page layouts, wherein each of the different page layouts is for a particular combination of a particular number of columns and a particular set of column widths.

7. The method of claim 6 wherein a particular page layout among the plurality of different page layouts includes two or more columns of non-equal widths.

8. The method of claim 1 wherein each of the page layout controls includes at least a first page layout control configured to add a section and a second page layout control configured to delete a section.

9. The method of claim 1 comprising:
receiving second input indicating a selection of a particular column in the electronic document;
receiving third input indicating selection of a second, different particular page layout control that is associated with changing to two or more columns;
in response to the third input, automatically modifying the source code by changing a portion of the coded hierarchy associated with the particular column to indicate the two or more columns based upon the second input;
causing generating a second updated editing view of the electronic document that graphically represents the two or more columns nested within the particular column.

10. A computer system comprising:
a computer coupled to a data storage device that comprises source code of an electronic document comprising content;
in the computer, a non-transitory computer-readable data storage device storing page layout logic as one or more sequences of instructions which when executed by one or more processors cause the computer to perform:
obtaining the source code of the electronic document;
in response to a request to activate a page layout of the electronic document and before receiving first input indicating a modification of the electronic document automatically modifying the source code by adding a coded hierarchy configured to specify definitions of one or more sections and one or more columns, and initially specifying a single section and a single column in the coded hierarchy to include the content that is specified by the source code when the electronic document is obtained;
receiving the first input indicating the selection of a particular page layout control among a plurality of page layout controls in a graphical user interface, the input specifying any of: adding a section; deleting a section; changing to a first number of columns;
in response to the first input, modifying the source code by changing the coded hierarchy to specify definitions of a different number of sections or the first number of columns as indicated by the input including at least, in part, the content specified by the source code when the electronic document is obtained in the different number of sections or the first number of columns;
causing generating an updated editing view of the electronic document that graphically represents the different number of sections or the first number of columns.

11. The computer system of claim 10 wherein the source code comprises HTML and wherein the coded hierarchy comprises two or more nested sets of division (DIV) tags.

12. The computer system of claim 11 wherein the sets comprise a first set of DIV tags that indicates a section and a second set of DIV tags, nested within the first set, which indicates one or more columns within the section.

13. The computer system of claim 10 wherein the page layout logic comprises instructions which when executed cause:
receiving second input indicating selection of a second, different particular page layout control that is associated with changing to two or more columns;
in response to the second input, automatically modifying the source code by changing the coded hierarchy to indicate the two or more columns based upon the second input, and by moving content from a section or single column of the electronic document to a particular column among the two or more columns;
causing generating a second updated editing view of the electronic document that graphically represents the two or more columns and the content in the particular column.

14. The computer system of claim 10 wherein the source code comprises HTML and wherein the coded hierarchy comprises two or more nested sets of division (DIV) tags, wherein the sets comprise a first set of DIV tags that indicates a layout, a second set of DIV tags, nested within the first set, which indicates one or more columns within the layout, and other sets of DIV tags, nested within the first set and second set, that indicate cell values within the column and content attributes of an inner cell within a first cell.

15. The computer system of claim 10 wherein each of the page layout controls is associated with a plurality of different page layouts, wherein each of the different page layouts is for a particular combination of a particular number of columns and a particular set of column widths.

16. The computer system of claim 10 wherein a particular page layout among the plurality of different page controls includes two or more columns of non-equal widths.

17. The computer system of claim 10 wherein each of the page layout controls includes at least a first page layout control configured to add a section and a second page layout control configured to delete a section.

18. The computer system of claim 10 comprising:
receiving second input indicating a selection of a particular column in the electronic document;
receiving third input indicating selection of a second, different particular page layout control that is associated with changing to two or more columns;
in response to the third input, automatically modifying the source code by changing a portion of the coded hierarchy associated with the particular column to indicate the two or more columns based upon the second input;
causing generating a second updated editing view of the electronic document that graphically represents the two or more columns nested within the particular column.

* * * * *